(12) United States Patent
Kojima

(10) Patent No.: US 6,770,116 B2
(45) Date of Patent: Aug. 3, 2004

(54) REGENERATION DEVICE OF EXHAUST GAS PURIFICATION FILTER AND FILTER REGENERATION METHOD

(75) Inventor: Masaaki Kojima, Gifu (JP)

(73) Assignee: Ibiden Co., Ltd., Ogaki (JP)

(*) Notice: Subject to any disclaimer, the term of this patent is extended or adjusted under 35 U.S.C. 154(b) by 7 days.

(21) Appl. No.: 10/220,283

(22) PCT Filed: Mar. 14, 2001

(86) PCT No.: PCT/JP01/02014

§ 371 (c)(1),
(2), (4) Date: Sep. 10, 2002

(87) PCT Pub. No.: WO01/69052

PCT Pub. Date: Sep. 20, 2001

(65) Prior Publication Data

US 2003/0019354 A1 Jan. 30, 2003

(30) Foreign Application Priority Data

Mar. 15, 2000 (JP) .................................. 2000-071914
Mar. 2, 2001 (JP) .................................. 2001-058873

(51) Int. Cl.[7] ............................................. B01D 46/00
(52) U.S. Cl. ......................... 95/14; 95/278; 95/283; 96/407; 96/420; 55/282.3; 55/283; 55/284; 55/385.3; 55/484; 55/523; 55/DIG. 10; 55/DIG. 30; 700/273; 369/273
(58) Field of Search .......................... 95/14, 18, 20, 95/278, 283; 96/401, 407, 420; 55/282.3, 283, 284, 385.3, 484, 523, DIG. 10, DIG. 30; 700/273, 274; 369/273

(56) References Cited

U.S. PATENT DOCUMENTS 5,458,673 A * 10/1995 Kojima et al. ................ 55/283
5,489,319 A * 2/1996 Tokuda et al. ............. 55/282.3
5,757,660 A * 5/1998 Musow ........................ 700/267
6,090,187 A * 7/2000 Kumagai ..................... 95/278

FOREIGN PATENT DOCUMENTS

| DE | 39 29 303 | * 3/1991 | ............ F01N/3/02 |
| JP | 27820/1991 | 3/1991 | |
| JP | 4-101013 | * 4/1992 | ............ F01N/3/02 |
| JP | 4-347316 | 12/1992 | |
| JP | 4-358714 | * 12/1992 | ............ F01N/3/02 |
| JP | 5-296027 | * 11/1993 | ............ F01N/3/02 |
| JP | 6-93828 | 4/1994 | |
| JP | 2001-280115 | * 10/2001 | ........... B01D/46/42 |
| JP | 2001-280122 | * 10/2001 | ........... B01D/46/42 |

* cited by examiner

Primary Examiner—Duane Smith
Assistant Examiner—Jason M. Greene
(74) Attorney, Agent, or Firm—Oblon, Spivak, McClelland, Maier & Neustadt, P.C.

(57) ABSTRACT

A regeneration device of an exhaust gas purification filter that reduces the regeneration time of the filter. The regeneration device includes a plurality of first temperature detectors arranged in casings to detect the temperature in each casing and a second temperature detector for detecting the temperature of the exhaust gas. A processor is connected to the first temperature detectors and the second temperature detector. The processor compares the temperature of the exhaust gas and the temperature of at least one of the casings, opens the associated switch valve based on the comparison result, and preheats at least one of the filters with the exhaust gas. The heat of the exhaust gas suddenly increases the temperature of the filter from the initial temperature and reduces the filter regeneration time.

11 Claims, 3 Drawing Sheets $t_2$: Exhaust Gas Temperature
$t_1$: Temperature In Casing

REGENERATION DEVICE OF EXHAUST GAS PURIFICATION FILTER AND FILTER REGENERATION METHOD

TITLE OF THE INVENTION

The present invention relates to a regeneration device, and more particularly, to a regeneration device of an exhaust gas purification filter and a filter regeneration method.

BACKGROUND OF THE INVENTION

The number of automobiles has been increasing drastically. The amount of gas discharged from the internal combustion engines has also increased drastically in proportion to the increase in the number of automobiles. The various substances included in the exhaust gas of a diesel engine have caused pollution, which has a severe impact on the world environment. Further, there have been recent reports on research results stating that fine particulates included in the exhaust gas cause allergic disorders and a decrease in the number of sperms. Accordingly, the removal of the particulates from the exhaust gas is a problem that must be immediately coped with by mankind.

Under such circumstances, various types of exhaust gas purification apparatuses have been proposed. An exhaust gas purification apparatus includes a plurality of filters that eliminate particulates discharged from internal combustion engines, such as diesel engines. When a filter is used for a long time, particulates are deposited in the filter. The deposited filter increases the load on the engine. Thus, the particulates must be eliminated.

Presently, when the particulates on a filter approach a maximum collection amount, a switch valve switches the filter through which exhaust gas flows. The filter through which the exhaust gas no longer flows is heated by an electric heater until it reaches a temperature at which the particulates are ignited. The filer is regenerated by burning and removing the particulates.

However, in the conventional purification apparatus, the electric heater heats the filter even if the initial temperature of the filter that is to be regenerated is lower than the temperature of the engine exhaust gas. This prolongs the filter regeneration time. For example, when the diesel engine is running continuously, the filter temperature is about the same as the exhaust gas temperature. However, when the diesel engine is stopped over a long period, the filter temperature is low, and the increase rate of the filter temperature is low. Thus, much time is required for the particulates to reach the ignitable temperature. This increases the regenerating time. In addition, the prolonged regenerating time lengthens the activation time of the electric heater, increases power consumption, and lowers the durability of the electric heater.

BRIEF SUMMARY OF THE INVENTION

It is an object of the present invention to provide a regeneration device of an exhaust gas purification filter and a filter regeneration method that reduces the regenerating time of a filter.

A first perspective of the present invention is a regeneration device of a filter in an exhaust gas purification apparatus of an internal combustion engine. The exhaust gas purification apparatus includes a plurality of casings arranged in a plurality of branch exhaust pipes of the internal combustion engine, a plurality of filters respectively accommodated in the casings, a plurality of heaters for heating the filters, and a plurality of switch valves arranged downstream to the casings to switch a flow route of exhaust gas. The regeneration device includes a plurality of first temperature detectors arranged in the casings to detect the temperature in each casing, and a second temperature detector for detecting the temperature of the exhaust gas. A processor is connected to the first temperature detectors and the second temperature detector. The processor compares the temperature of the exhaust gas and the temperature of at least one of the casings, opens the associated switch valve based on the comparison result, and preheats at least one of the filters with the exhaust gas. Accordingly, the heat of the exhaust gas increases the temperature of the filter from the initial temperature in a sudden manner and reduces the filter regeneration time.

A second perspective of the present invention is a method for regenerating a filter in an exhaust gas purification apparatus of an internal combustion engine. The regeneration method includes the steps of detecting the temperature of the exhaust gas, detecting the temperature of at least one of the casings, comparing the temperature of the exhaust gas and the temperature of the at least one of the casings, supplying exhaust gas to the at least one of the casings to preheat the associated filter with the heat of the exhaust gas by opening the associated switch valve when the comparison result is greater than a predetermined value, stopping the supply of exhaust gas to the at least one casing after the preheating is completed, and activating the associated heater to further heat the associated filter.

A third perspective of the present invention is a filter regeneration program executed by a computer in an exhaust gas purification apparatus. The program includes the steps of comparing the temperature of the exhaust gas and the temperature of at least one of the casings with the computer, supplying exhaust gas to the at least one of the casings to preheat the associated filter with the heat of the exhaust gas by opening the associated switch valve with the computer when the comparison result is greater than a predetermined value, stopping the supply of exhaust gas to the at least one casing with the computer after the preheating is completed, and activating the associated heater with the computer to further heat the associated filter.

A fourth perspective of the present invention is a computer-readable recording medium recording a program for regenerating a filter in an exhaust gas purification apparatus. The program includes the steps of comparing the temperature of the exhaust gas and the temperature of at least one of the casings, supplying exhaust gas to the at least one of the casings to preheat the associated filter with the heat of the exhaust gas by opening the associated switch valve when the comparison result is greater than a predetermined value, stopping the supply of exhaust gas to the at least one casing after the preheating is completed, and activating the associated heater with the computer to further heat the associated filter.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

An exhaust gas purification apparatus according to an embodiment of the present invention will now be discussed with reference to the drawings.

Figure 1:
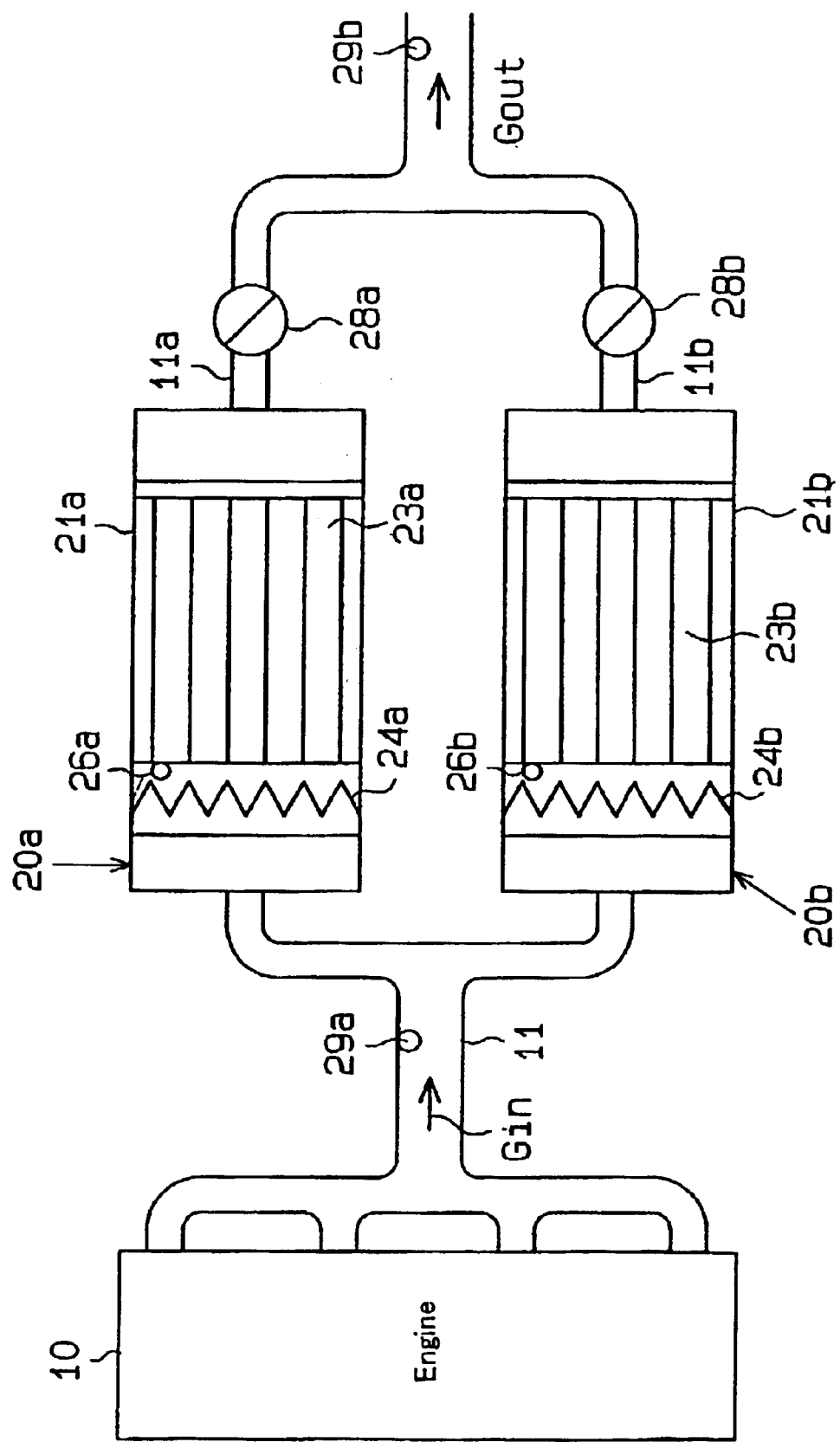
FIG. 1 is a schematic view showing a regeneration system of an exhaust gas purification apparatus according to an embodiment of the present invention.

As shown in FIG. 1, an exhaust passage 11, which is connected to a diesel engine 10 serving as an internal combustion engine, includes two branch pipes 11a, 11b. A first exhaust gas purification device 20a is arranged in the branch pipe 11a, and a second exhaust gas purification device 20b is arranged in the branch pipe 20b. The exhaust gas purification device 20a has a casing 21a, which accommodates a honeycomb-like first filter 23a to purify the exhaust gas. The exhaust gas purification device 20b also has a casing 21b, which accommodates a honeycomb-like second filter 23b to purify the exhaust gas.

Each filter 23a, 23b is made of a porous silicon carbide (SiC), and the sinter carries an exhaust gas purification catalyst. The filters 23a, 23b have extremely high heat conductivity. Thus, the heat of exhaust gas is effectively conducted downstream and in the radial direction. When excessive burning occurs locally, the heat is efficiently dispersed.

A first electric heater 24a for heating the filter 23a is arranged in the casing 21a near the gas upstream side of the filter 23a. A second electric heater 24b for heating the filter 23b is arranged in the casing 21b near the gas upstream side of the filter 23b. The electric heaters 24a, 24b are helical resistor-heating heaters and are activated by power supplied from a battery (not shown). The shape of the electric heaters 24a, 24b is not limited to the helical form.

A first thermocouple 26a is arranged near the electric heater 24a in the casing 21a, and a second thermocouple 26b is arranged near the electric heater 24b in the casing 21b. A first electromagnetic valve 28a is arranged in the branch pipe 11a downstream to the filter 23a. A second electromagnetic valve 28b is arranged in the branch pipe 11b downstream to the filter 23b. A pressure sensor 29a is arranged in the exhaust passage 11 upstream to the filters 23a, 23b, and a pressure sensor 29b is arranged in the exhaust passage 11 downstream to the filters 23a, 23b.

A regeneration device 100 of the exhaust gas purification filters 23a, 23b will now be described with reference to FIG. 2.

Figure 2:
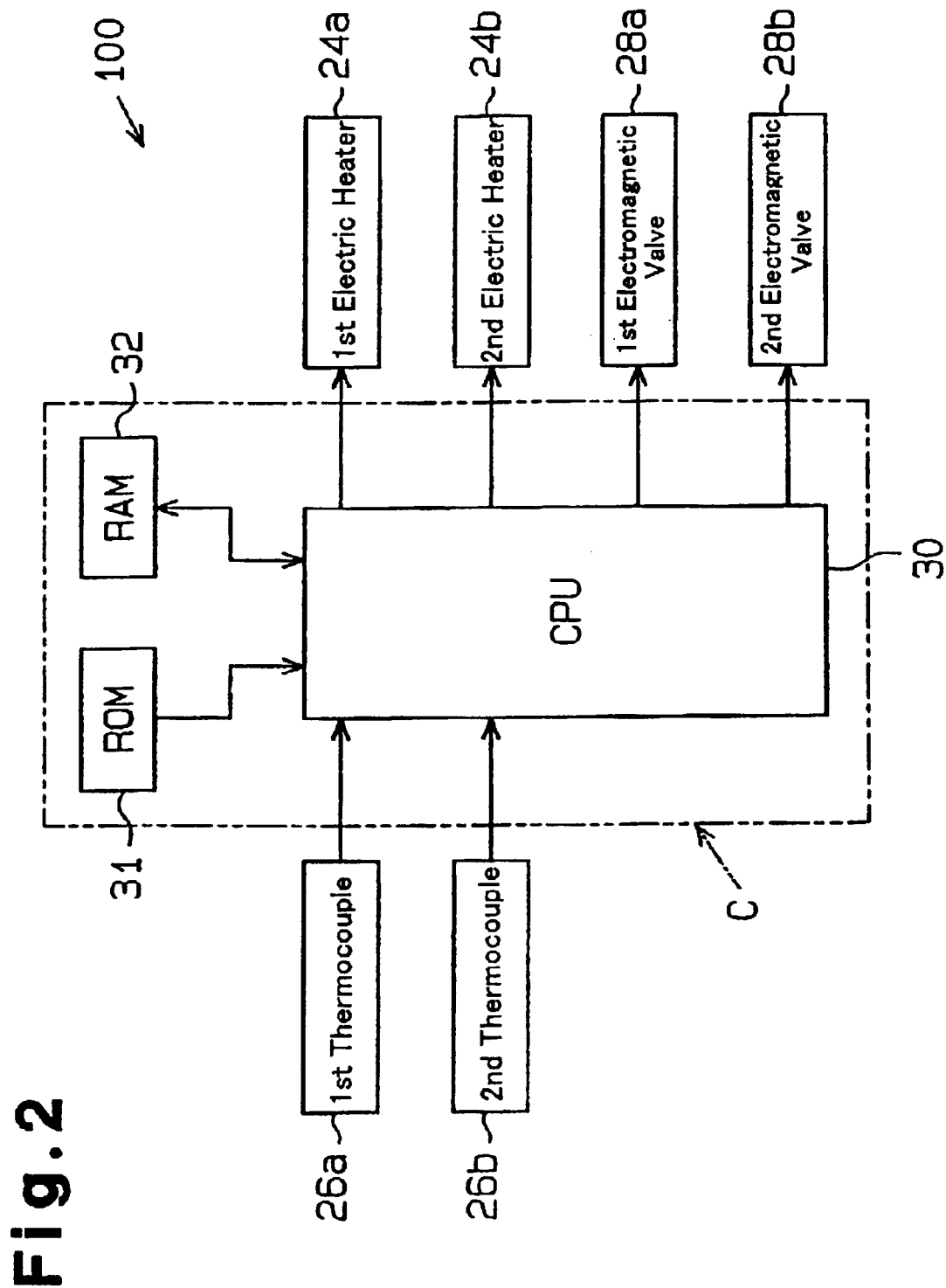
FIG. 2 is a schematic block diagram of the exhaust gas purification apparatus.

Referring to FIG. 2, the first thermocouple 26a detects the temperature of the electric heater 24a, the exhaust gas temperature, and the temperature in the casing 21a and provides a first detection signal to a computer C. The second thermocouple 26b detects the temperature of the electric heater 24b, the exhaust gas temperature, and the temperature in the casing 21b and provides a second detection signal to the computer C.

The computer C includes a CPU 30, a ROM 31, and a RAM 32. The CPU 30 is provided with the first and second detection signals from the thermocouples 26a, 26b. The temperatures in the casings 21a, 21b correspond to the temperatures of the locations where the first and second thermocouples 26a, 26b are arranged. That is, the temperatures in the casings 21a, 21b correspond to the temperatures between the diesel engine 10 and the filters 23a, 23b. More specifically, the temperatures in the casings 21a, 21b correspond to the temperatures between the filters 23a, 23b and the electric heaters 24a, 24b.

The ROM 31 stores a computer control program for controlling the regeneration device 100 of the exhaust gas purification filters 23a, 23b. The RAM 32 temporarily stores the data required to execute the control program, such as temperature data of the interior of the casing 21a, 21b and temperature data of the exhaust gas. Further, the CPU 30 reads the control program from the ROM 31 and executes the control program.

The CPU 30 compares the temperature in the casing 21a (or 21b), which accommodates the filter that is to be regenerated, and the temperature of the exhaust gas, which is sent to the filter 23b (or 23a) used to purify the exhaust gas. The CPU 30 determines whether the comparison result is greater than or less than a predetermined value and controls the opening and closing of the electromagnetic valves 28a, 28b so that exhaust gas is sent to the first filter 23a or the second filter 23b in accordance with the comparison result. During filter regeneration, the CPU 30 provides the electric heaters 24a, 24b with a drive signal to activate the electric heaters 24a, 24b.

The pressure sensor 29a detects a backpressure value of the exhaust gas upstream to the filter 23 and provides a detection signal to the CPU 30. The pressure sensor 29b detects a backpressure value of the exhaust gas downstream to the filter 23 and provides a detection signal to the CPU 30. The CPU 30 calculates the pressure loss from the detection signal and detects the amount of particulates, such as soot, deposited in the filter 23. The pressure loss refers to the value obtained by subtracting the downstream side backpressure value of the filter 23 from the upstream side back pressure value. Thus, when the value of the pressure loss is high, the amount of the particulates deposited in the filter 23 is relatively large.

Figure 3:
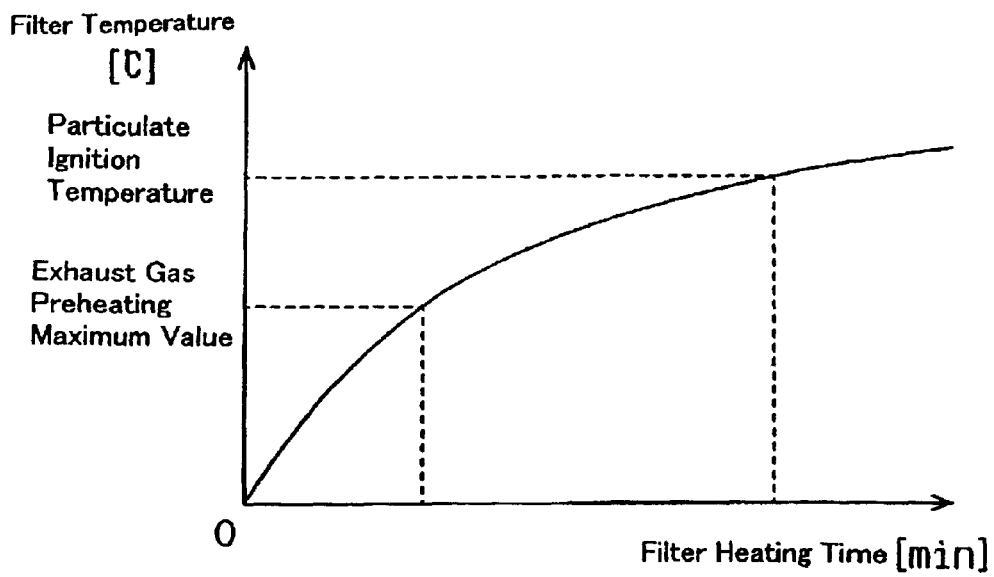
FIG. 3 is a graph illustrating the relationship between the filter temperature and the filter heating time.

The RAM 32 stores a temperature increase map indicating the relationship between the temperatures of the filters 23a, 23b and the filter heating time, as shown in FIG. 3. The vertical axis of the temperature increase map represents the filter temperature, and the horizontal axis represents the filter heating time of the electric heaters 24a, 24b. The temperature increase map of FIG. 3 shows a single filter temperature increase curve but actually includes a plurality of filter temperature increase curves respectively corresponding to a plurality of initial temperatures.

Figure 4:
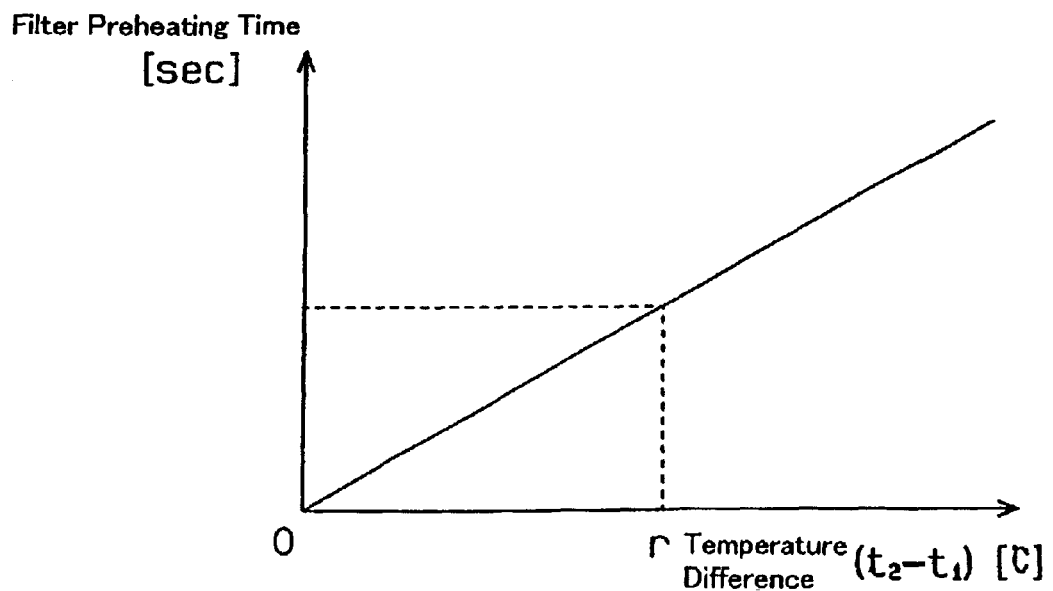
FIG. 4 is a graph illustrating the relationship between the filter preheating time and the temperature difference.

The RAM 32 stores a filter preheating map, which is referred to when performing preheating prior to regeneration, as shown in FIG. 4. The horizontal axis of the preheat processing map represents the temperature difference (t2−t1) between the temperatures t1 of the casings 21a, 21b and the temperature t2 of the exhaust gas. The vertical axis represents the filter preheating time.

A process for activating the exhaust gas purification devices 20a, 20b and regenerating the filters 23a, 23b will now be discussed.

Among the two exhaust gas purification devices 20a, 20b, one of the devices removes the particulates included in the exhaust gas and the filter of the other device is regenerated. An example in which the first filter 23a purifies the exhaust gas while the second filter 23b is regenerated will now be discussed. In this case, the first electromagnetic valve 28a is opened, and exhaust gas is sent to the first filter 23a. That is, the exhaust gas of the diesel engine 10 first flows into cells of the first filter 23a. The exhaust gas then passes through inner walls defining the cells and is discharged from the downstream side of the first filter 23a. In this state, the particulates included in the exhaust gas do not pass through the inner walls of the first filter 23a and become trapped in the inner walls. As a result, purified exhaust gas is discharged from the downstream side of the first filter 23a and ultimately released into the atmosphere.

When the amount of the particulates deposited in the filter 23 approaches the maximum tolerable deposit amount, the regeneration of the first filter 23a is initiated, and the second filter 23b purifies exhaust gas.

The first thermocouple 26a detects the temperature t1 in the first casing 21a, and the second thermocouple 26b detects the temperature t2 of the exhaust gas flowing through the second casing 21b. When the temperature difference (t2−t1) is less than or equal to a predetermined value, the CPU 30 determines that the initial temperature of the first filter 23a that is to be regenerated is high enough. Based on the determination, the CPU 30 closes the first electromagnetic valve 28a and activates the first electric heater 24a. In this manner, the heat of the first electric heater 24a heats the first filter 23a. This completely burns and eliminates the particulates deposited in the filter 23.

While the first electric heater 24a is performing heating, the heating temperature of the first electric heater 24a is detected by the first thermocouple 26a. In accordance with the detection result, the heating time of the first electric heater 24a is adjusted at constant time intervals through feedback control. The heating time of the first electric heater 24a (i.e., the time during which the first electric heater 24a is supplied with power) is calculated from the temperature increase map of FIG. 3. The first electric heater 24a is supplied with power in accordance with the calculated heating time. After the heating time elapses, the supply of power to the electric heater 24 is stopped, and the regeneration of the first filter 23a is completed.

When the difference (t2−t1) between the temperature t1 in the first casing 21a and the temperature t2 of the exhaust gas flowing through the second casing 21b is greater than or equal to the predetermined value, it is determined that the initial temperature of the first filter 23a, which is to be regenerated, is low. Such a case occurs when, for example, the diesel engine 10 is stopped for a long period of time. When the engine 10 is not running and exhaust gas is not discharged from the diesel engine 10, the temperatures of the filters 23a, 23b decrease.

When the initial temperature of the filter 23a is low, the CPU 30 performs preheating before regenerating the first filter 23a. More specifically, the CPU 30 opens the first and second electromagnetic valves 28a, 28b and supplies exhaust gas to the first filter 23a, which is to be regenerated, in addition to the second filter 23b, which is to perform purification. As a result, the initial temperature of the first filter 23a is increased within a short period of time by the heat of the exhaust gas. The CPU 30 calculates the preheating time of the first filter 23a (i.e., exhaust gas supplying time) from the preheat processing map of FIG. 4 and supplies the first filter 23a with exhaust gas in accordance with the calculated time.

After the exhaust gas supplying time elapses, the CPU 30 closes the first electromagnetic valve 28a and stops the supply of exhaust gas to the first filter 23a. This completes the preheating of the first filter 23a. Then, the CPU 30 activates the first electric heater 24a and regenerates the first filter 23a. After the regeneration is completed, the CPU 30 controls the opening and closing of the electromagnetic valves 28a, 28b to switch the flow route of the exhaust gas and perform filter regeneration and exhaust gas purification.

The regeneration device 100 of the present invention has the advantages described below.

(1) When the difference between the exhaust gas temperature and the temperature of the filter 23a, 23b that is to be regenerated is greater than the predetermined value, the electromagnetic valves 28a, 28b are opened and exhaust gas flows into the casings 21a, 21b. The heat of the exhaust gas heats the filters 23a, 23b to a predetermined temperature. Afterward, the filters 23a, 23b are further heated by the electric heaters 24a, 24b. As a result, the initial temperature of the filter that is to be regenerated increases within a short period of time. This reduces the filter regeneration time.

(2) When the initial temperature of the filters 23a, 23b are low, the exhaust gas heat is used to preheat the filters. This shortens the time during which the electric heaters 24a, 24b are supplied with power, prevents the power consumed by the electric heaters 24a, 24b from increasing, and prevents the durability of the electric heaters 24a, 24b from decreasing. In addition, the energy efficiency for regenerating the filters 23a, 23b is increased. This decreases the load on the automobile battery and suppresses battery drain.

(3) The thermocouples 26a, 26b are arranged in the flow route of the exhaust gas between the diesel engine 10 and the filters 23a, 23b. Thus, in comparison to when a thermocouple is arranged at a downstream side of the filters 23a, 23b, the time during which the filter 23a, 23b that is to be regenerated reaches the predetermined temperature from the initial temperature is accurately predicted. Accordingly, the preheating of the filters 23a, 23b is guaranteed. In addition, the thermocouples 26a, 26b are arranged in the vicinity of the upstream side of the filters 23a, 23b. Thus, the exhaust gas temperature just before the exhaust gas is supplied to the filters 23a, 23b is detected. Accordingly, the time during which the filters 23a, 23b reach the predetermined temperature from the initial temperature is further accurately predicted.

(4) The arrangement of the thermocouples 26a, 26b in the vicinity of the electric heaters enables temperature detection of the electric heaters 24a, 24b. This decreases the number of the thermocouples 26a, 26b, simplifies the structures of the exhaust gas purification devices 20a, 20b, and decreases manufacturing costs.

(5) When the exhaust gas heats the filters 23a, 23b from the initial temperature to the substantially maximum temperature (i.e., particulate ignition temperature), the preheating is completed, the electromagnetic valves 28a, 28b are closed, and the electric heaters are activated. Thus, the filters 23a, 23b are efficiently heated within a short period of time.

It should be apparent to those skilled in the art that the present invention may be embodied in many other specific forms without departing from the spirit or scope of the invention. Particularly, it should be understood that the present invention may be embodied in the following forms.

(a) When the initial temperature of the filter 23a, 23b that is to be regenerated is low, the heat of the exhaust gas and the heat of the electric heaters 24a, 24b may be used to increase the temperature from the initial temperature. This increases the temperature of the filters 23a, 23b from the initial temperature within a shorter time.

(b) When the initial temperature of the filter 23a is low, the CPU 30 may open the first electromagnetic valve 28a, supply the first filter 23a that is to be regenerated with exhaust gas, and preheat only the first filter 23a.

(c) Instead of comparing the temperatures in the casings 21a, 21b with the exhaust gas temperature and determining whether or not to perform preheating based on the comparison result, thermocouples may be in direct contact with the filters 23a, 23b to detect the temperatures of the filters 23a, 23b.

(d) The present invention may be applied to an exhaust gas purification system having three or more casings, each accommodating a filter.

(e) Instead of detecting the exhaust gas temperature and the temperatures of the electric heaters 24a, 24b with the thermocouples 26a, 26b, another thermocouple may be arranged in the exhaust passage 11 near a manifold of the diesel engine 10 to detect the temperature of the exhaust gas.

(f) The filter preheating map of FIG. 4 and the temperature increase map of FIG. 3 may be stored in the ROM 31 instead of the RAM 32.

(g) In addition to the ROM 31, which is a semiconductor memory, the control program of the exhaust gas purification filter regeneration device 100 may be stored in a recording medium, such as a floppy disk or a hard disk. The control program may also be stored in a portable type recording medium, such as a CD-ROM or a DVD.

(h) The computer C may be connected to a computer network, such a LAN, a WAN like the Internet, or a wireless communication network, and the control program may be stored in the RAM 32 of the computer C via the WAN or the computer network. Further, the control program stored in the ROM 31 may be transferred to the recording medium of another computer via the computer network.

The present examples and embodiments are to be considered as illustrative and not restrictive, and the invention is not to be limited to the details given herein, but may be modified within the scope and equivalence of the appended claims.

What is claimed is:

1. A regeneration device of a filter in an exhaust gas purification apparatus of an internal combustion engine, wherein the exhaust gas purification apparatus includes a plurality of casings arranged in a plurality of branch exhaust pipes of the internal combustion engine, a plurality of filters respectively accommodated in the casings, a plurality of heaters for heating the filters, and a plurality of switch valves arranged downstream to the casings to switch a flow route of exhaust gas, the regeneration device comprising:

a plurality of first temperature detectors arranged in the casings to detect the temperature in each casing;

a second temperature detector for detecting the temperature of the exhaust gas; and a processor connected to the first temperature detectors and the second temperature detector to compare the temperature of the exhaust gas and the temperature of at least one of the casings, open the associated switch valve based on the comparison result, and preheat at least one of the filters with the exhaust gas.

2. The regeneration device according to claim 1, wherein the processor compares the temperature of the exhaust gas and the temperature of at least one of the casings and opens the associated switch valve when the temperature difference is greater than or equal to a predetermined value to preheat at least one of the filters with the exhaust gas.

3. The regeneration device according to claim 1, wherein the processor compares the temperature of the exhaust gas and the temperature of at least one of the casings and opens all of the switch valves when the temperature difference is greater than or equal to a predetermined value to preheat the filters with the exhaust gas.

4. The regeneration device according to claim 1, wherein the second temperature detector and is one of the plurality of first temperature detectors arranged near the heaters, wherein each of the plurality of first temperature detectors also detects the temperature of the exhaust gas flowing through the associated casing.

5. The regeneration device according to claim 1, wherein the second temperature detector is one of the plurality of first temperature detectors arranged in the vicinity of the upstream side of the filters, wherein each of the plurality of first temperature detectors also detects the temperature of the exhaust gas just before the associated filter.

6. The regeneration device according to claim 1, wherein, after the preheating of the at least one of the filters is completed, the processor closes the associated switch valve and activates the associated heater.

7. The regeneration device according to claim 1, wherein the second temperature detector is one of the plurality of first temperature detectors arranged between each electric heater and each filter, wherein each of the plurality of first temperature detectors also detects the temperature of the exhaust gas flowing through the associated casing.

8. A method for regenerating a filter in an exhaust gas purification apparatus of an internal combustion engine, wherein the exhaust gas purification apparatus includes a plurality of casings arranged in a plurality of branch exhaust pipes of the internal combustion engine, a plurality of filters respectively accommodated in the casings, a plurality of heaters for heating the filters, and a plurality of switch valves arranged downstream to the casings to switch a flow route of exhaust gas, the method comprising:

detecting the temperature of the exhaust gas;

detecting the temperature of at least one of the casings;

comparing the temperature of the exhaust gas and the temperature of the at least one of the casings;

supplying exhaust gas to the at least one of the casings to preheat the associated filter with the heat of the exhaust gas by opening the associated switch valve when the comparison result is greater than a predetermined value;

stopping the supply of exhaust gas to the at least one casing after the preheating is completed; and activating the associated heater to further heat the associated filter.

9. The method according to claim 8, wherein the preheating step includes preheating the associated filter with the heat of the exhaust gas and the heat of the associated heater.

10. A filter regeneration program executed by a computer in an exhaust gas purification apparatus, wherein the exhaust gas purification apparatus includes a plurality of casings arranged in a plurality of branch exhaust pipes of an internal combustion engine, a plurality of filters respectively accommodated in the casings, a plurality of heaters for heating the filters, and a plurality of switch valves arranged downstream to the casings to switch a flow route of exhaust gas, the program comprising:

comparing the temperature of the exhaust gas and the temperature of at least one of the casings with the computer;

supplying exhaust gas to the at least one of the casings to preheat the associated filter with the heat of the exhaust gas by opening the associated switch valve with the computer when the comparison result is greater than a predetermined value;

stopping the supply of exhaust gas to the at least one casing with the computer after the preheating is completed; and activating the associated heater with the computer to further heat the associated filter.

11. A computer-readable recording medium recorded thereon a program for regenerating a filter in an exhaust gas purification apparatus, wherein the exhaust gas purification apparatus includes a plurality of casings arranged in a plurality of branch exhaust pipes of an internal combustion engine, a plurality of filters respectively accommodated in the casings, a plurality of heaters for heating the filters, and a plurality of switch valves arranged downstream to the casings to switch a flow route of exhaust gas, the program executing a method comprising comparing the temperature of the exhaust gas and the temperature of at least one of the casings;

supplying exhaust gas to the at least one of the casings to preheat the associated filter with the heat of the exhaust gas by opening the associated switch valve when the comparison result is greater than a predetermined value;

stopping the supply of exhaust gas to the at least one casing after the preheating is completed; and activating the associated heater with the computer to further heat the associated filter.

* * * * *